United States Patent [19]

Ohki

[11] Patent Number: 5,488,558
[45] Date of Patent: Jan. 30, 1996

[54] HANDY COMPUTER WITH BUILT-IN DIGITAL CAMERA AND SPOT STATE RECORDING METHOD USING THE SAME

[75] Inventor: Sinji Ohki, Matsubara, Japan

[73] Assignee: Daishin Instrument Co., Ltd., Osaka, Japan

[21] Appl. No.: 274,753

[22] Filed: Jul. 14, 1994

[30] Foreign Application Priority Data

Oct. 20, 1993  [JP]  Japan .................................. 5-262078
Jan. 19, 1994  [JP]  Japan .................................. 6-003849

[51] Int. Cl.$^6$ .................................................... G06K 9/22
[52] U.S. Cl. ................................................................ 364/449
[58] Field of Search ........................... 364/443, 444, 364/449, 188, 189; 382/1, 44, 48; 358/350

[56] References Cited

U.S. PATENT DOCUMENTS

| | | | |
|---|---|---|---|
| 4,796,190 | 1/1989 | Cummings | 364/449 |
| 5,073,819 | 12/1991 | Gates et al. | 358/107 |
| 5,155,774 | 10/1992 | Numagami | 382/1 |
| 5,247,356 | 9/1993 | Ciampa | 358/109 |
| 5,267,042 | 11/1993 | Tsuchiya et al. | 358/209 |
| 5,296,884 | 3/1994 | Honda et al. | 354/106 |
| 5,317,323 | 5/1994 | Kennedy et al. | 342/457 |
| 5,335,072 | 8/1994 | Tanaka et al. | 348/232 |
| 5,364,093 | 11/1994 | Huston et al. | 273/32 R |
| 5,396,431 | 3/1995 | Shimizu et al. | 364/449 |
| 5,414,462 | 5/1995 | Veatch | 348/135 |

*Primary Examiner*—Kevin J. Teska
*Assistant Examiner*—Stephen J. Walder, Jr.
*Attorney, Agent, or Firm*—Armstrong, Westerman, Hattori, McLeland & Naughton

[57] ABSTRACT

In a handy computer having an image pickup unit, a drawing or map information of a large area which including a prearranged portion to be inspected is stored, the prearranged portion to be inspected is specified on the drawing or the map information to thereby calculate positional data. The positional data is associated with photographed image data of an inspected portion which has been photographed by the image pickup unit.

6 Claims, 10 Drawing Sheets

< Step B >

Fig. 8

<Step C>

Fig. 9

<Step D>

Fig. 10

\<Step E\>

Photographed image data

Positional data
X, Y

Memory

Fig. 11

HANDY COMPUTER WITH BUILT-IN DIGITAL CAMERA AND SPOT STATE RECORDING METHOD USING THE SAME

BACKGROUND OF THE INVENTION

1. Field of the Invention

The present invention relates to a handy computer with a built-in digital camera, which is capable of being readily used for inspection of various constructions during or after execution of construction work, for spot inspection of the state of executing construction work of roads, railways or rivers, and the maintenance state thereof, and further for record of accidental spots or management of parking offenses, etc. The invention also relates to a spot state recording method using the same camera.

2. Discussion of the Related Art

For example, there are many situations where, in a new constructions work or a reconstruction work for various constructions, the state of under construction and after the construction are inspected and recorded (hereinafter referred to as "spot inspection"). Up to now, the spot inspection has been recorded as stated below. Firstly, both of a primary constructor and a subconstructor carry a construction plan and a camera to the spot, and at the spot, the primary constructor recognizes whether the construction work is executed in accordance with the plan or not, and if he finds out any defective portions, he indicates this matter to the subconstructor. Then, the subconstructor checks the portion thus indicated on the plan, takes a photograph of the indicated portion, and records the photograph and the indicated portion on the plan in association with each other on a document.

However, it is troublesome to associate the defective portion indicated on the plan with the photograph, and also it is not easy to write the inspected matters in the plan and to handle the camera at the working spot with an insufficient footing.

Further, materials prepared on the basis of the inspection like this need to be kept for a given period of time. However, since the materials are stored in the form of documents, it is troublesome to take out the necessary materials from a large amount of inspection materials some other day. In order to rationalize the management of the materials, it is considered to store the materials in an electronic file. In this case, the construction design plan and the photographic image must be read by an image scanner or the like, resulting also in troublesomeness.

Various problems as mentioned above are not limited to the spot inspection for the state of the construction work, but also commonly applied to other works requiring the spot inspection.

For example, for recording the spot inspection for the state of executing construction work of roads, railways or rivers, and the maintenance state thereof, a person carries a large-area map including a spot to be inspected and a camera to the spot, and takes a photograph of the spot to be inspected while checking the spot to be inspected on the map.

The works as mentioned above tends to be accompanied with the same problems. Moreover, those problems exist in the following cases, that is, in a case where the maintenance of a construction is inspected on the basis of a construction plan, a case where the maintenance of a road is conducted on the basis of a road map, a case where the maintenance of a river is conducted on the basis of a river map, a case where the maintenance of a railway is conducted on the basis of a railway map, a case where the state of a public work or road construction is inspected on the basis of a general map or a road map, a case where an accidental spot is inspected on the basis of the general or road map, and the like.

SUMMARY OF THE INVENTION

The present invention has been achieved in view of the above situation, and an object of the invention is to provide an art which is capable of significantly simplifying spot inspection works requiring a plan, a map and a camera, such as a work for recording the state of executing the construction work of a building, the working state or maintenance state of a road, railway or river, or the like and also capable of facilitating control of the recording materials.

In order to solve the above-mentioned problems, the present invention has been achieved by provision of a handy computer with a built-in digital camera, which comprises a handy computer body including a portable interior power source and a bus coupling terminal for connection with a peripheral equipment, and an image pickup unit mainly including an electric charge coupled device and an imaging lens, which is coupled with the handy computer body through a bus. The handy computer body further includes the followings therein; a memory means for storing a drawing or map information of a large area with a spot to be inspected; a display unit which is capable of switching or divisionally displaying the graphic display of the drawing or map information and a photographed image picked up by an image pickup unit; a microprocessor for bearing internal processing of the handy computer body and signal processing of an image output signal transmitted from the image pickup unit; an input operation unit for giving various instructions to the handy computer body and for inputting data; means for selectively calling, in the display means, the drawing or map information of a small area including an actual spot to be inspected from the whole information of the drawing or map of a large area including a prearranged spot to be inspected, which has been stored in the memory means, for graphic display; means for specifying and indicating, on the display means, the actual spot to be inspected on the drawing or map information of a small area which has been graphically displayed on the display means; means for calculating the positional data of the portion specified and indicated on the display means on the drawing or map information; and means for storing the photographed image data transmitted from the image pickup unit and the positional data in association with each other.

The handy computer with the built-in digital camera (hereinafter referred to as "handy computer") is considered to transmit and receive data to/from a main computer located on a fixed base such as an office or the like. For transferring and receiving data, there are methods in which the handy computer and the main computer are connected to each other through a detachable cable, a radio method using an electric wave an infrared ray, etc., or the like. It is more preferable to use a transportable memory medium connectable mutually to the handy computer and the main computer, and also having a memory capacity which is capable of storing a drawing or map information of a large area including a prearranged spot to be inspected.

As a means for selectively calling, onto a display means, the drawing or map information of a small area including an actual spot to be inspected from the whole information of the drawing or map having the large area, it is considered to use a GPS (global positioning system) which is, for example, used for a vehicle navigator or the like, besides means depending upon a key board operation or a pen input device.

An image pickup unit may be assembled into a handy computer body, or may be detachably attached to the handy computer body.

A spot state recording method using the handy computer with the built-in digital camera thus organized mainly consists of the following respective steps.

A) A step of data-transferring the drawing or map information of a large area including a spot to be inspected from a library for the drawing or map information stored in a computer which is located in a fixed base such as an office or the like, to the handy computer, directly or through the transportable memory medium.

B) A step of carrying the handy computer having a memory means which stores the drawing or map information of a large area including a prearranged spot to be inspected as well as selectively supplying the drawing or map information of a small area including an actual spot to be inspected from the whole information of the drawing or map of the large area stored in the memory means to a display means for graphic display.

C) A step of specifically indicating, on the display means, the actual spot to be inspected in the drawing or map information of a small area which has been graphically displayed on the display means, and of calculating positional data of the actual spot to be inspected on the drawing or the map information.

D) A step of adjusting a pose of the handy computer so that the actual spot to be inspected falls within a view field of an image pickup unit, and subsequently of picking up the image of the portion to be inspected.

E) A step of storing, in a memory means, a photographed image data sent from the image pickup unit and the positional data in association with each other.

F) A step of transferring the photographed image data and the positional data, which have been associated with each other and stored in the memory means equipped in the handy computer body, to the computer located in the fixed base directly or through the transportable memory medium.

The handy computer with the built-in digital camera thus organized is used in the following manner.

First, the handy computer receives the whole information on the drawing or map showing the environment including the spot to be inspected from the computer located on the fixed base, and the handy computer which stores the large area information therein is brought to the spot. Subsequently, at the spot, the drawing or map information of the small area including the actual spot to be inspected is selectively called onto the display means, and then on the selected screen, after the actual spot to be inspected, which will be photographed later, is specified and indicate so as to be decided, an objective is photographed by the image pickup unit.

With only such operations, the positional data of the photographed portion in the whole information of the drawing or map is automatically calculated, and the positional data and image data photographed by the image pickup unit are stored together in the memory means in such a manner that they are associated with each other. While repeating such operations that a portion to be photographed is specified, and defined every time the portion to be photographed is changed, a data group maintaining a correspondence of the respective positional data and the respective photographed image data is stored within the handy computer body by merely repeating image pickup by the image pickup unit.

The stored data group can be re-displayed on the display means of the handy computer body for confirmation, or if the data group is transferred to the main computer located in the fixed base, the advanced data processing or data control can be applied.

In the case where the handy computer is equipped with a GPS using a communication satellite which is capable of measuring an absolute position, since the present position at which a measurer exists is automatically measured, the present rough position is capable of being automatically specified in accordance with the whole information of the map, and by merely operating fine adjustment on the basis of this data, the portion to be photographed can be readily specified and indicated on the display means.

In the case where the image pickup unit is detachably attached to the handy computer body, the image pickup unit is detached from the handy computer body as occasion demands, and other peripheral equipments such as a printer, a MODEM and the like are connected to a bus coupling terminal of the handy computer body, to which the image pickup unit had been attached, whereby multi-functional processing can be realized while maintaining the simplicity of the handy computer.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings.

DETAILED DESCRIPTION OF THE PREFERRED EMBODIMENTS

Embodiments of the invention will be described in detail with reference to the accompanying drawings.

Figure 1:
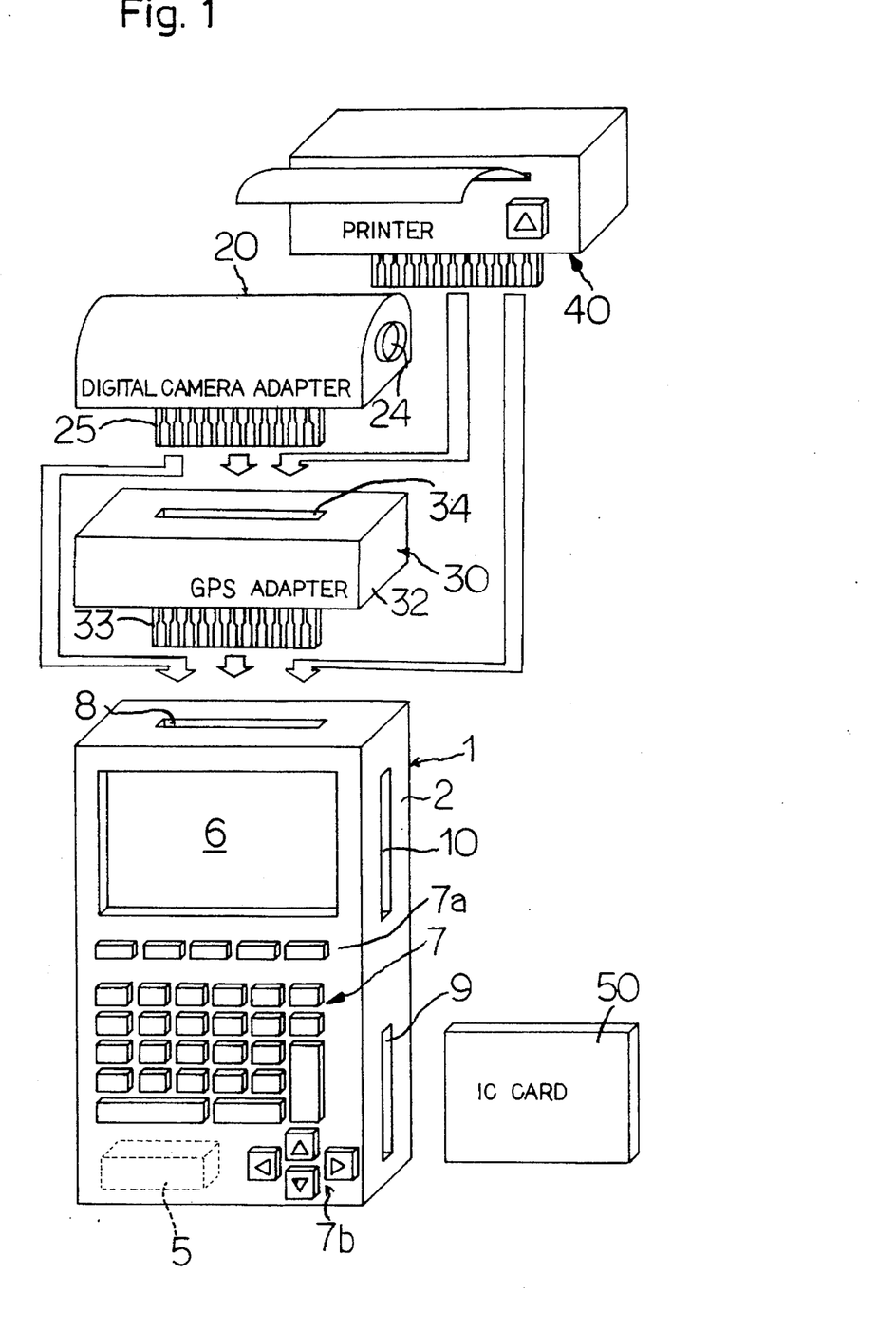
FIG. 1 is an explanatory diagram showing an outer appearance of a handy computer in accordance with the present invention.
Figure 2:
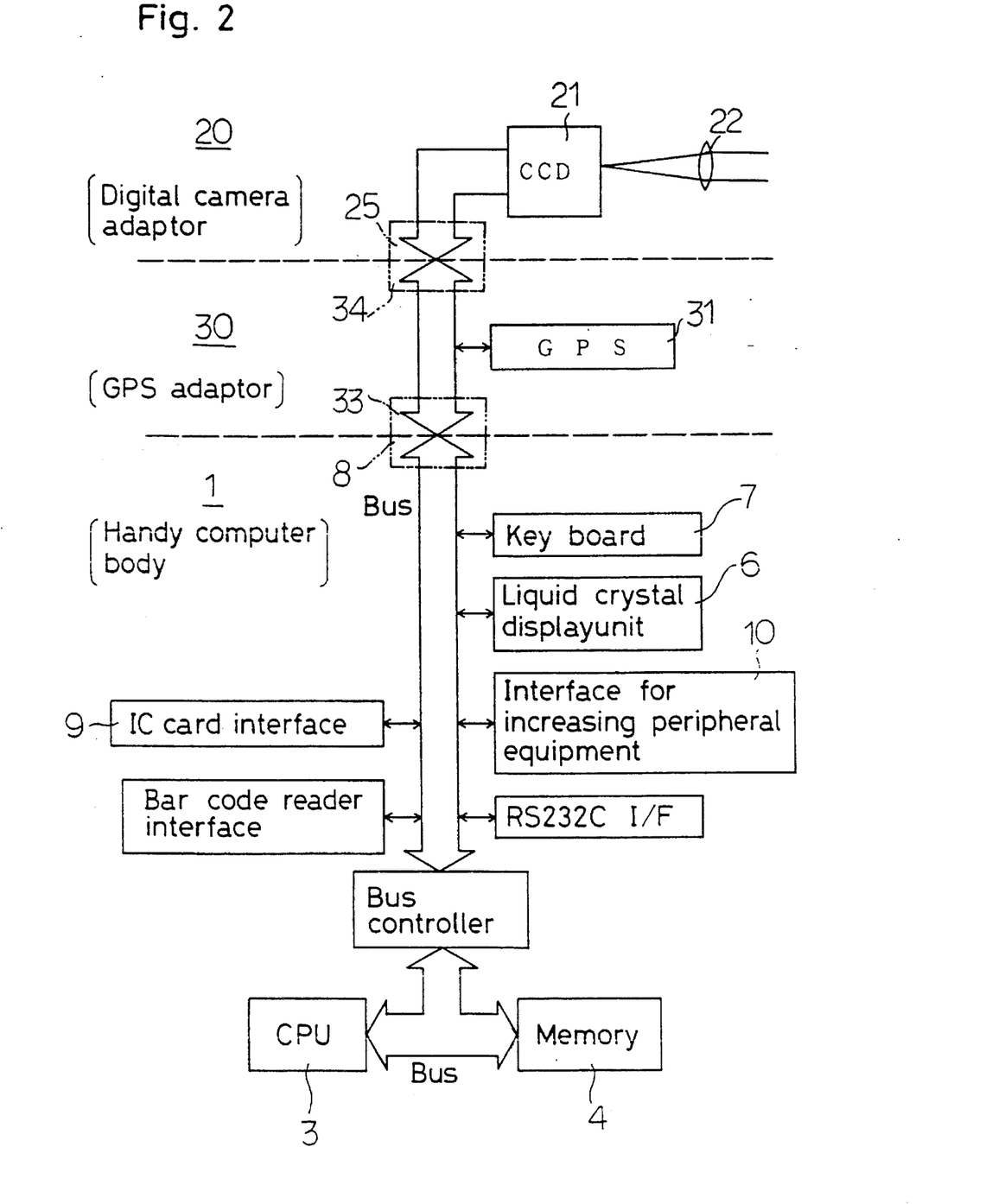
FIG. 2 is a block diagram showing a systematic structure of the handy computer shown in FIG. 1.
Figure 3:
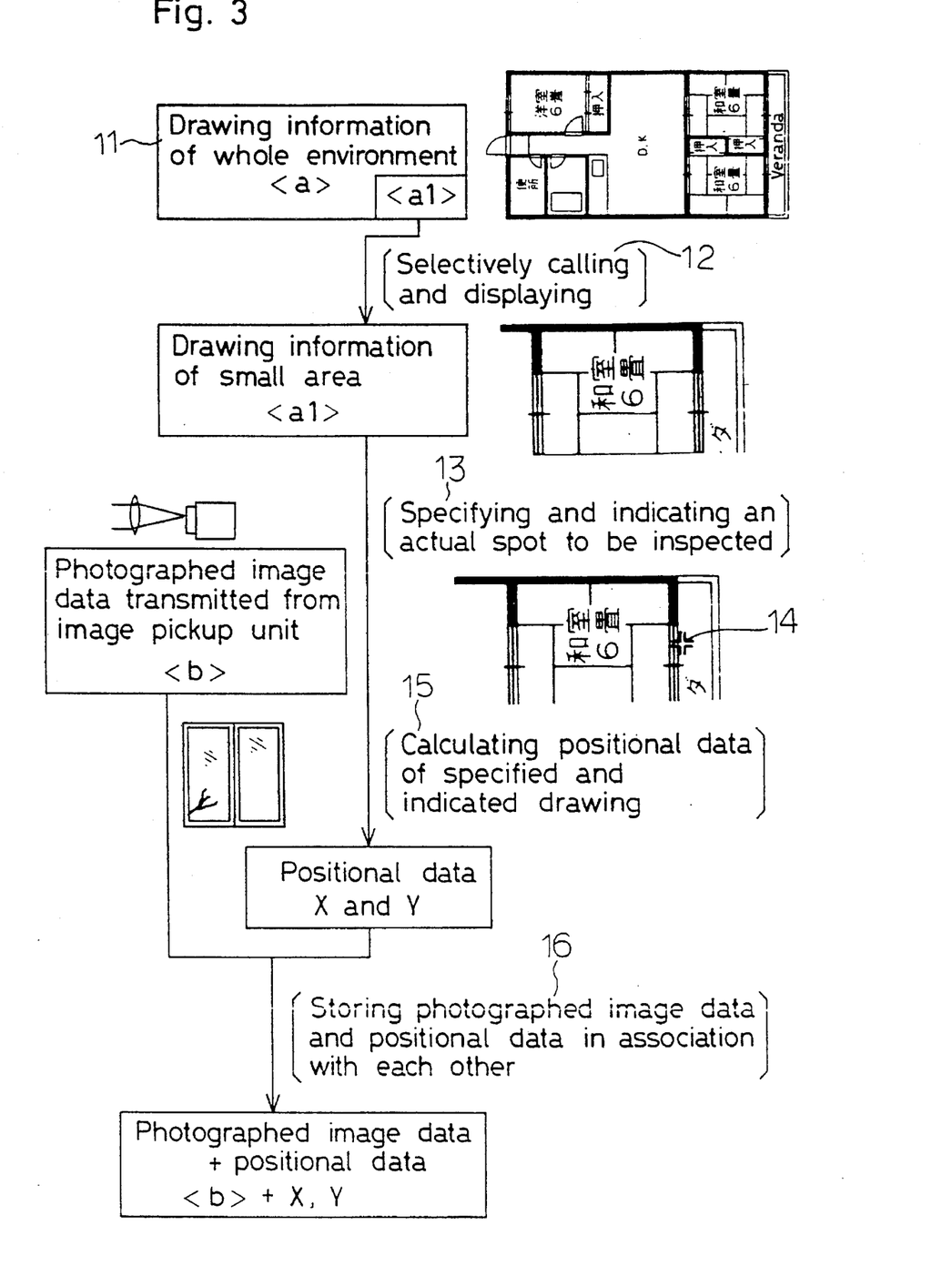
FIG. 3 is a diagram showing a processing system which is realized by hardware or software equipped within a handy computer body.

FIG. 1 is an explanatory diagram showing an outer appearance of a handy computer in accordance with the present invention. FIG. 2 is a block diagram showing a systematic structure of the handy computer shown in FIG. 1. FIG. 3 is a diagram showing processing contents of each means which is realized by a hardware structure or software structure within a handy computer body.

In the figures, reference numeral 1 denotes a handy computer body; 20, a digital camera adaptor for a handy computer (hereinafter referred to as "digital camera adaptor 20"); and 30, a GPS adaptor.

The handy computer body 1 includes a body case 2 having such a size as to be portable by one hand for accommodating all the fundamental functions as a computer. Installed in the body case 2 are a microprocessor 3, a memory 4 and various control circuits as well as a portable interior power source 5 such as a dry battery, a charging battery or the like. Disposed on the outer surface of the body case 2 are a display unit 6, which is of a thin type with a low power consumption rate and enables graphic display by dots, as is represented by a liquid crystal display unit or plasma display unit, and a key board 7 as an input operating means are installed on the outer surface of the body case 2. The key board 7 is provided with function keys 7a, cursor moving keys 7b, and the like. A pen input system (not shown) is applicable for the input operating means in lieu of the key board input unit, or both the key board input unit and the pen input unit may be used together.

On the top surface of the body case 2, there is provided a bus coupling terminal 8 directly connected to the microprocessor 3. Connectable to the bus coupling terminal 8 are various peripheral equipments such as a GPS adaptor 30, a digital camera adaptor 20, a printer 20, a MODEM (not shown) and the like. The bus coupling terminal 8 shown in the figure is of the female type, however, it may be of the male type.

At the side surface of the body case 2, there are provided an IC card interface 9 for loading an IC card 50 as one type of an exterior memory means, and an interface 10 for increasing the peripheral equipments such as a floppy disc drive (FDD), and furthermore, a hard disc drive (HDD), a CD-ROM, a rewritable photomagnetic disc drive (MO), and the like.

As for the IC card 50, any one of a memory card with a built-in CPU and the memory card without the built-in CPU can be used. As a system of coupling the IC card 50 with the handy computer body 1, any one of a contact type coupling unit and a non-contact type coupling unit may be applied. In view of the dust-proof and the earthquake-proof as well as simple handling facility, it is preferable to use the non-contact type coupling unit.

There is a case where both of the IC card interface 9 and the peripheral equipment increasing interface 10 are not provided, or there is a case where only one of them is provided. An RS 232 C interface for connection with a general purpose MODEM, or the like, or a bar code reader interface may be provided (not shown).

The display unit 6 is constituted so as to be capable of reproducing and displaying photographed image data taken into the memory 3, and the drawing or map information read through the IC card 50, FDD or cable, and also capable of directly displaying an image output signal from the CCD 21 to monitor the present photographing state.

The present photographing state can be confirmed by the display unit 6 of the handy computer body 1 whereby a photographing range, image density, resolution and the like are adjusted while viewing a display screen. As a result, an image can be taken in the optimum state. The image density adjustment and resolution adjustment may be performed in a hardware manner by additionally providing an adjusting circuit. However, in view of the wide use and the common use of the microprocessor, it is preferable to process those adjustments in a software manner. As the image density adjustment, there can be applied a method of thinning out the blinks of dots at given intervals, or the like. The image data may be compressed in the software manner.

The screen display unit is constituted so as to switchably display the information read in the memory 4 from the IC card 50 or the FDD and the image data which is now being photographed by the image pickup unit, or to divide the screen into a plurality of screens for simultaneous display.

An image processing program is always stored in the memory a or is read from the IC card, FDD or the like, as occasion demands. As a method of always storing the program in the memory 2, it can be applied that the program may previously be written in a ROM or a flash memory which is one type of a nonvolatile memory, or the program read from the exterior may always be stored in a RAM.

In this embodiment, a part of the memory 4 is made to be nonvolatile by use of the flash memory, and an image adjusting program as well as a business program for a specified use are stored in the nonvolatile portion of the memory 4. Since the program always stored in the flash memory is read from the IC card 50 or FDD and rewritten if required, a hand computer for a specific use can be provided even by use of a common handy computer, and also flexibly adaptable even to the version-up of the program.

The digital camera adaptor 20 is constituted so that it can be detachably connected to a head portion of the handy computer body 1 directly or through the GPS adaptor 30.

Figure 4:
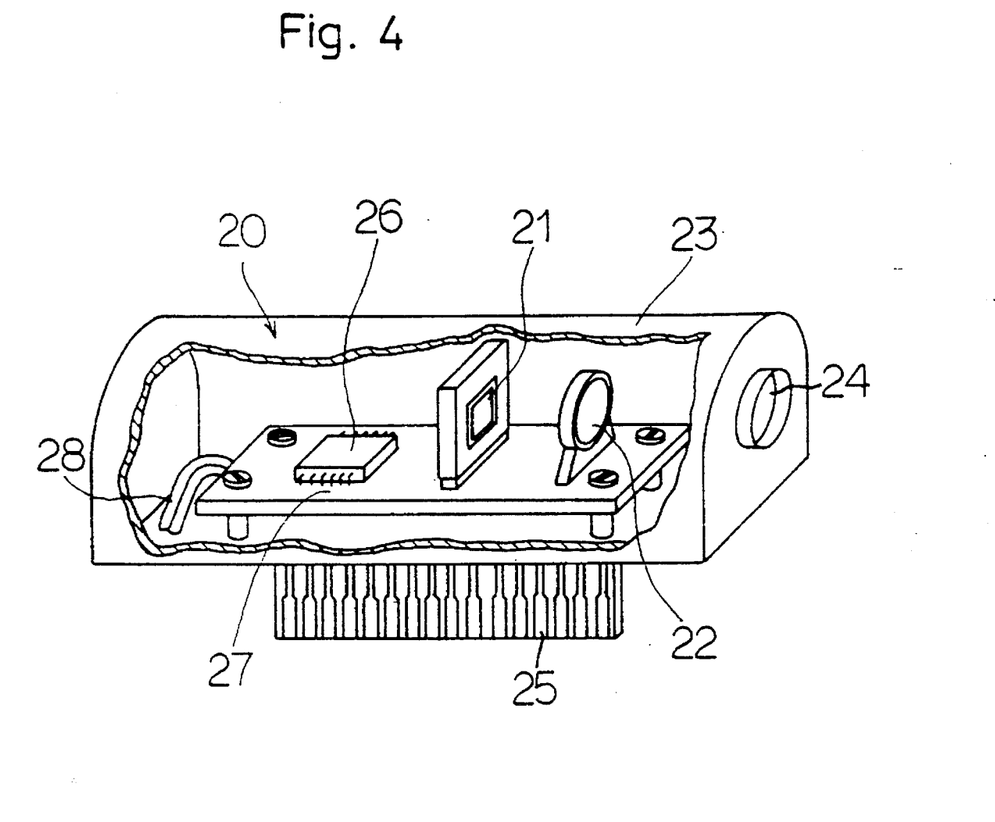
FIG. 4 is an explanatory diagram showing an internal mechanism of a digital camera adaptor in accordance with one embodiment of the invention.

The digital camera adaptor 20 is constituted, as shown in FIG. 4, in such a manner that the image pickup unit mainly including the CCD 21 and a lens 22 for forming an image on the CCD 21 is accommodated in an adaptor case 23. Disposed in the side surface of the adaptor case 23 is an opening 24 for forming an optical path for the lens 22. Disposed on the lower surface of the adaptor case 23 is a male type bus coupling terminal 25 corresponding to the bus coupling terminal 8 provided in the handy computer body 1.

Fitted to the opening 21 are a transparent resin plate and a lens which forms the optical path directed to the CCD 21 in combination with the lens 22 accommodated in the adaptor case 23. The lens 22 and the lens fitted to the opening 24 may be formed of a glass lens or a resin lens. In view of making the device lighter in weight and lower in costs, it is preferable to use the resin lens. A structure in which the lens can be moved forward and backward may be added to the lens so as to realize focussing function. Furthermore, only one lens which is directly fitted to the opening 24 may be used to reduce the number of parts. Moreover, a single image pickup part, into which the CCD 21 has been originally integrated with the lens 22, may be used. The position at which the opening 22 is formed is not limited to that shown in the figures, but may be formed on the top surface or back surface of the adaptor case 23.

The CCD 21, the lens 22 and the number of element groups 26 are directly mounted on a single substrate 27 in such a manner that an optical axis which links the CCD 21 and the lens 22 is positioned in an optical path of light incident from the opening 22 of the adaptor case 23. A multiconductor flat cable 28 is led from one side of the substrate 27 so that the other end of the cable 28 is connected to the male type bus coupling terminal 25 (not shown). Thus, since all the main parts of the optical system and the electrical system are mounted on the substrate 27 of one piece, assembling of the digital camera adaptor 20 is remarkably facilitated, to thereby lowering the assembling costs.

Although the number of element groups 26 are mounted on the substrate 27, these element groups 26 are limited to only minimum elements necessary for matching the output signal from the CCD 21 with the bus line, and the microprocessor and the memory are not mounted thereon.

The image output signal from the CCD 21 is directly transferred to the microprocessor 3 within the handy computer body 1 through the bus so as to be signal-processed within the handy computer body 1, and then displayed on the display unit 6. The power supply to the digital camera adaptor 20 is also supplied from the handy computer body 1 through the bus line. Thus, only the minimum required number of parts are used for the digital camera adaptor 20, whereby the digital camera adaptor 20 can be offered inexpensively.

Figure 5:
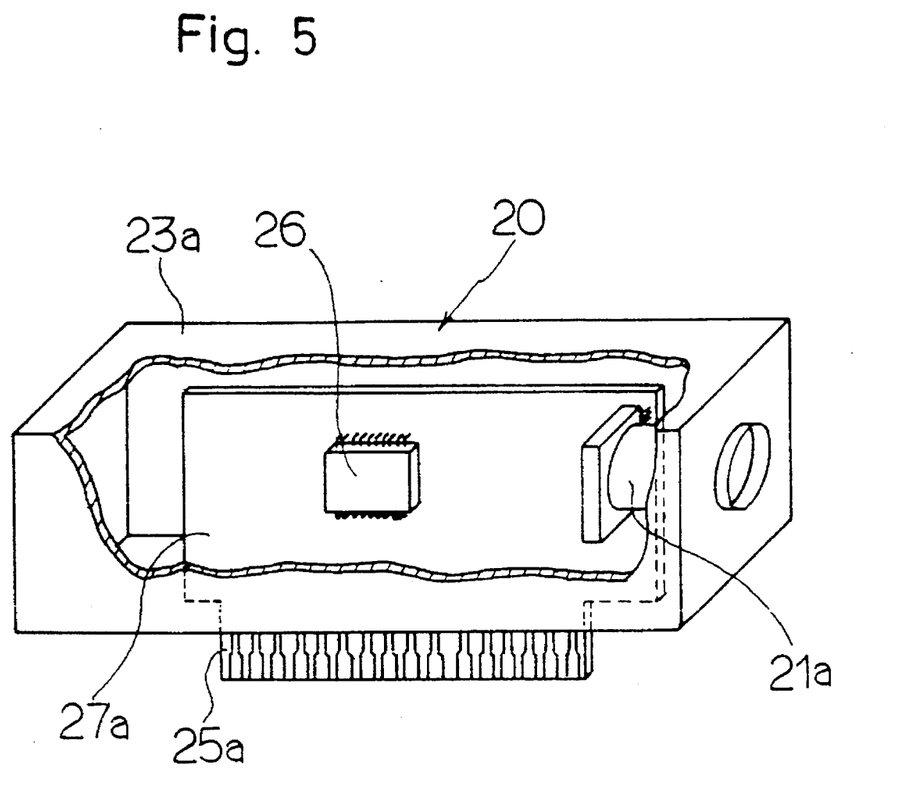
FIG. 5 is an explanatory diagram showing the internal mechanism of the digital camera adaptor in accordance with another embodiment of the invention.

FIG. 5 shows the internal structure of the digital camera adaptor 20 in accordance with another embodiment of the invention. In this embodiment, an image pickup component 21a, into which a CCD and a lens are integrated, are mounted on a substrate 27a having one surface on which a coupling terminal portion is directly formed in a patterning manner by etching, or the like. The substrate 27a is set up within an adaptor case 23a. The coupling terminal portion of the substrate 27a penetrates the case 23a so as to expose from the outer portion of the case 23a, and the exposed portion is directly utilized as a male type bus coupling terminal 25a. With such an organization, no additional bus coupling terminal is required to be disposed at the adaptor side, and no multiconductor flat cable is also required. As a result, the number of assembling steps are furthermore reduced. In the embodiment as shown, there is used the image pickup component 21a into which the CCD and the lens are integrated together. However, the CCD and the lens may be provided as separate parts.

Assembled in a GPS adaptor 30 is a GPS adaptor which constitutes an absolute position measuring unit using a communication satellite which is so-called "global positioning system". A male type bus coupling terminal 33 and a female type bus coupling terminal 32 are provided on the outer surface of a case 32 for the GPS adaptor 30. The bus coupling terminal 8 of a handy computer body 1 is capable of being fixed to the male type bus coupling terminal 33, whereas the digital camera adaptor 20 or a printer 40 is capable of being fixed to the female type bus coupling terminal 34.

Upon receipt of a positional signal from the communication satellite, the GPS 31 is capable of measuring the present position of an observer within several meters of error range. The positional data is transmitted to the handy computer body 1 whereby the work for specifying where the observer, that is, an inspector exists on the drawing or map information is facilitated. Therefore, in the case where the handy computer deals with the map information, it is particularly preferable to provide the GPS adaptor 30. When the handy computer deals with information such as a construction design plan or a floor plan, no GOS adaptor 30 is required. In this case, the digital camera adaptor 20 or the printer 20 is fixed to the bus coupling terminal 8 of the handy computer body 1.

Inside of the handy computer with the above-mentioned hardware structure, respective means for realizing the processing contents shown in FIG. 3 are constituted by software or hardware. An example in which "a floor plan of an apartment" is stored in the memory 4 of the handy computer is taken to describe a recording step of the spot state on the basis of the floor plan of the apartment. The drawing information stored in the memory 4 may be of a complicated construction design plan, map information, or the like.

First, there is provided a memory means 11 for storing drawing information <a> of the environment including a prearranged spot to be inspected. The memory capacity of the memory means 11 is preferably sufficient to simultaneously store the floor plans of a plurality of houses. Description will be given on the assumption that a drawing for the plane of one house has been stored in the memory means 1. The memory means 11 generally comprises a part of the memory 4. The drawing information <a> may be of vector data or image data.

Subsequently, there is provided a selection display means 12 to graphically display a drawing information <a1> of a small area including an actual spot to be inspected by selectively called onto the display unit 6 from the drawing information <a> of the whole environment (that is, the drawing information <a> of a large area) stored in the memory means 11.

Extraction of the drawing information <a1> of the small area from the drawing information <a> of the whole environment is made in the following manner.

First, the drawing information <a> of the whole environment is displayed on the display unit 6, a cursor moving key 7b is operated on a display screen to move a cursor at a position close to the portion to be inspected, and thereafter, an area switching function key (not shown) is depressed for performing the extraction, or the pen input unit allows a position closed to the portion to be inspected to be directly indicated for performing the extraction. Alternatively, a pressure sensitive touch panel, which is capable of directly indicating the coordinates on the display screen, is lamination-disposed in front of the display screen so that the portion to be inspected can be pressed by a finger.

Furthermore, there is disposed an inspection portion specifying/indicating means 13 for specifying and indicating the portion to be inspected on the display means from the drawing information <a1> of the small area which has been graphically displayed on the display unit 6. For example, if a portion to be inspected is of a glass window at a veranda side, the cursor 14 is moved to the glass window portion at the veranda side in the drawing information <a]> of the small area displayed on the screen, and "a decision key" or the like is depressed. In this case, the pen input unit or the pressure sensitive touch panel can be used as in the above example.

Further, there is provided a positional data calculating means 15 for calculating positional data X and Y of the specified and indicated portion on the drawing. The actual operation is executed by the microprocessor 3.

Furthermore, there is provided an association storage processing means 16 for storing the photographed image data <b> of the portion to be inspected, which has been obtained from the image pickup unit, and the positional data X and Y in association with the photographed image data <b>. The photographed image data <b> and the positional data X and Y may be stored together in the association storage processing means 16, or may be stored in respective different memory areas of the means 16 in such a manner that they are linked with each other. Since the positional data X and Y correspond to the photographed image data <b>, it is controlled to which portion in the drawing information <a> the respective photographed image data <b> corresponds. For example, in the case where "a glass window at the veranda side" is damaged, and the coordinates X and Y of "the glass window at the veranda side" on the drawing information <a> are (1024, 611), positional data of (1024, 611) is added to the photographed image data of the damaged glass window, and then stored in the memory.

The handy computer of the embodiment is thus constituted by combination of hardware and software.

Subsequently, the respective steps in the spot state recording method using the above handy computer will be described individually.

Figure 6:
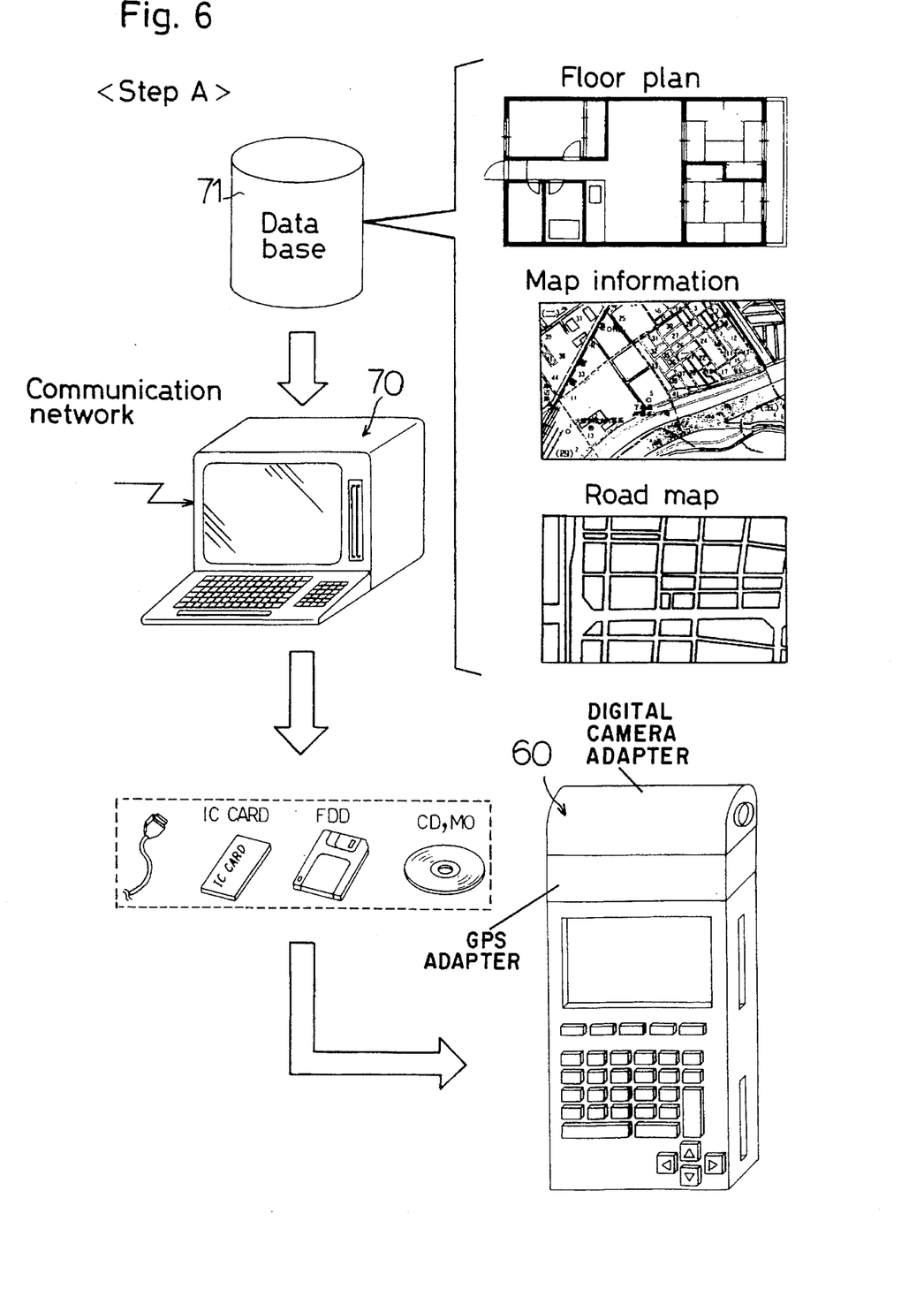
FIG. 6 is an explanatory diagram showing "Step A" in a spot state recording method in accordance with the present Invention.

<Step A> (FIG. 6)

The drawing information with a large area including a prearranged spot to be inspected is delivered to the handy computer 60 from the library of a drawing data base 7N installed in a computer 70 which is located in a fixed base such as an office or the like. The drawing information includes a construction plan such as a design drawing, a floor plan, or the like, and various maps including a general map for distinct purposes such as a configuration map, a river map, a road map, and the like. However, the drawing information does not exclude the drawings and maps other than the above. The computer 70 is connect to a communication network so that it can exchange information with a large-sized computer equipped in a head office, computers in other business offices, and moreover computers in the same line of business.

For the purpose of delivering the drawing information from the computer 70 to the handy computer 60, there are two methods, a method of performing the delivery through a transportable memory medium, and a method of performing the delivery with the computer 70 and the handy computer 60 being directly connected with each other through a cable. An IC card, floppy disc, MO, CD-ROM, or the like can be used for the transportable memory medium. In view of the facility of handling, it is most preferable to use an IC card of the non-contact coupling system.

In the case of using the CD-ROM, because of incapability of writing in this medium, without copying data, the drawing data base 71 per se in the computer 70 is previously constituted by a lot of CD-ROMs, and a necessary CD-ROM is selected from the drawing data base 71 to be read by a CD-ROM drive which is attached to the handy computer 60. Since the CD-ROM is capable of storing a large amount of data, a lot of drawings can be stored together in the CD-ROM. In particular, the CD-ROMs storing widely-used map data have been already developed, and such CD-ROMs can be used. However, in the case of using the CD-ROM, it goes without saying that rewritable medium such as an IC card, floppy disc or the like is required in order to return the photographed image data and the positional data from the handy computer 60 to the computer 70.

Hereinafter, for the purpose of explaining the present invention more concretely, description aims at map information, and an example of preparing information on a ready-built house on the basis of the map information will be described.

Figure 7:
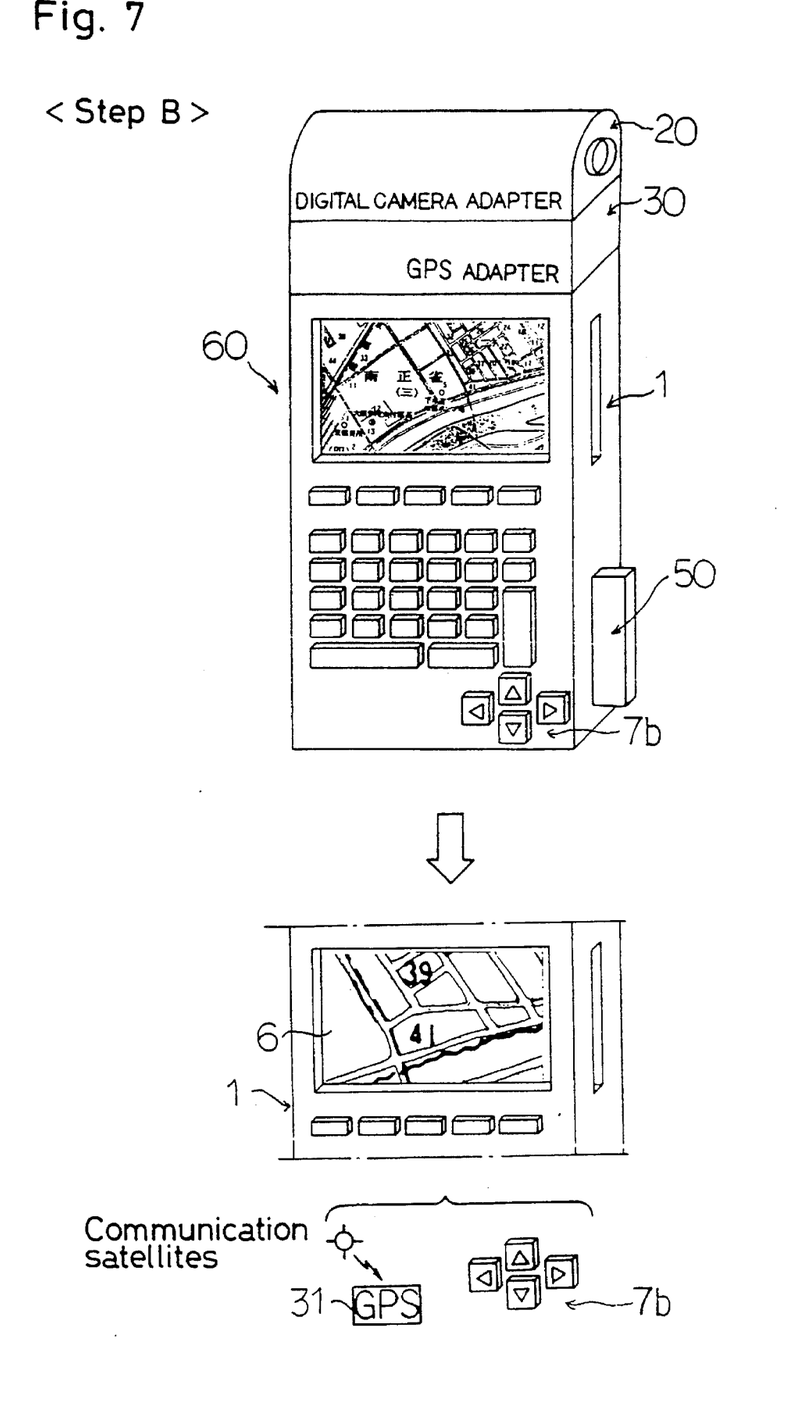
FIG. 7 is an explanatory diagram showing "Step B" in the spot state recording method in accordance with the invention.

<Step B> (FIG. 7)

The handy computer 60 storing map information (large-area map information) on the environment including a prearranged spot to be inspected is brought to the prearranged spot to be inspected, and then small-area map information including an actual spot to be inspected is selectively called onto a display screen.

Calling the small-area map information is performed by operating the cursor moving key 7b to move the cursor to an intended position on the screen displaying the large-area map information, and thereafter by pressing a decision key, or by directly indicating the necessary map information through the pen input unit. In the case where the handy computer 60 is equipped with the GPS adaptor 30, calling of the small-area map information is more simplified. That is, the operation of the GPS after arrival of an observer at the spot is sufficient to automatically measure a present position on receipt of electric wave from a plurality of communication satellites, and also to calculate the coordinates of the spot to be inspected on the large-area map information from the obtained absolute position to thereby automatically display the small-area map information including the spot to be inspected on the display screen.

Figure 8:
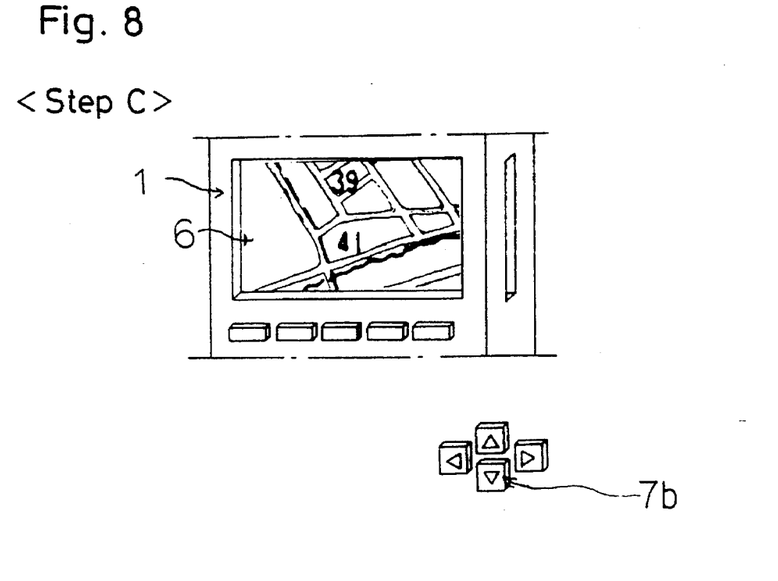
FIG. 8 is an explanatory diagram showing "Step C" in the spot state recording method in accordance with the invention.
Figure 9:
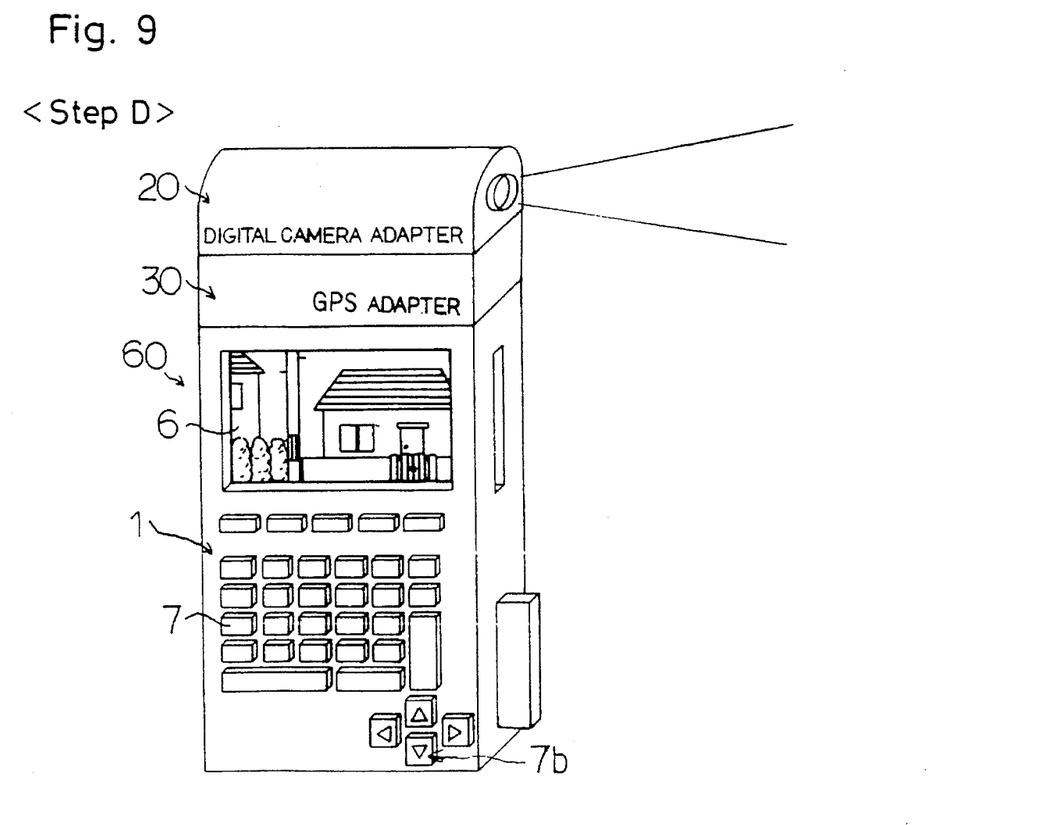
FIG. 9 is an explanatory diagram showing "Step D" in the spot state recording method in accordance with the invention.

<Step C> (FIG. 8)

In the small-area map information displayed on the screen, an actual spot to be inspected is specified and indicated on the display means. To specify and indicate the actual spot is performed as well as the previous step B by the operation of a cursor moving key 7b, pen input unit, and the like. The positional data X and Y corresponding to a point which has been thus specified and indicated is calculated by the microprocessor. In the case where accuracy of the GPS adaptor is extremely heightened to the degree that the positional measurement can be performed within an error range of 2 to 3 m, all the operations are capable of being entrusted to the GPS without conducting the manual operation for displaying the large-area map information and indication the actual spot to be inspected on the small-area map information.

Figure 10:
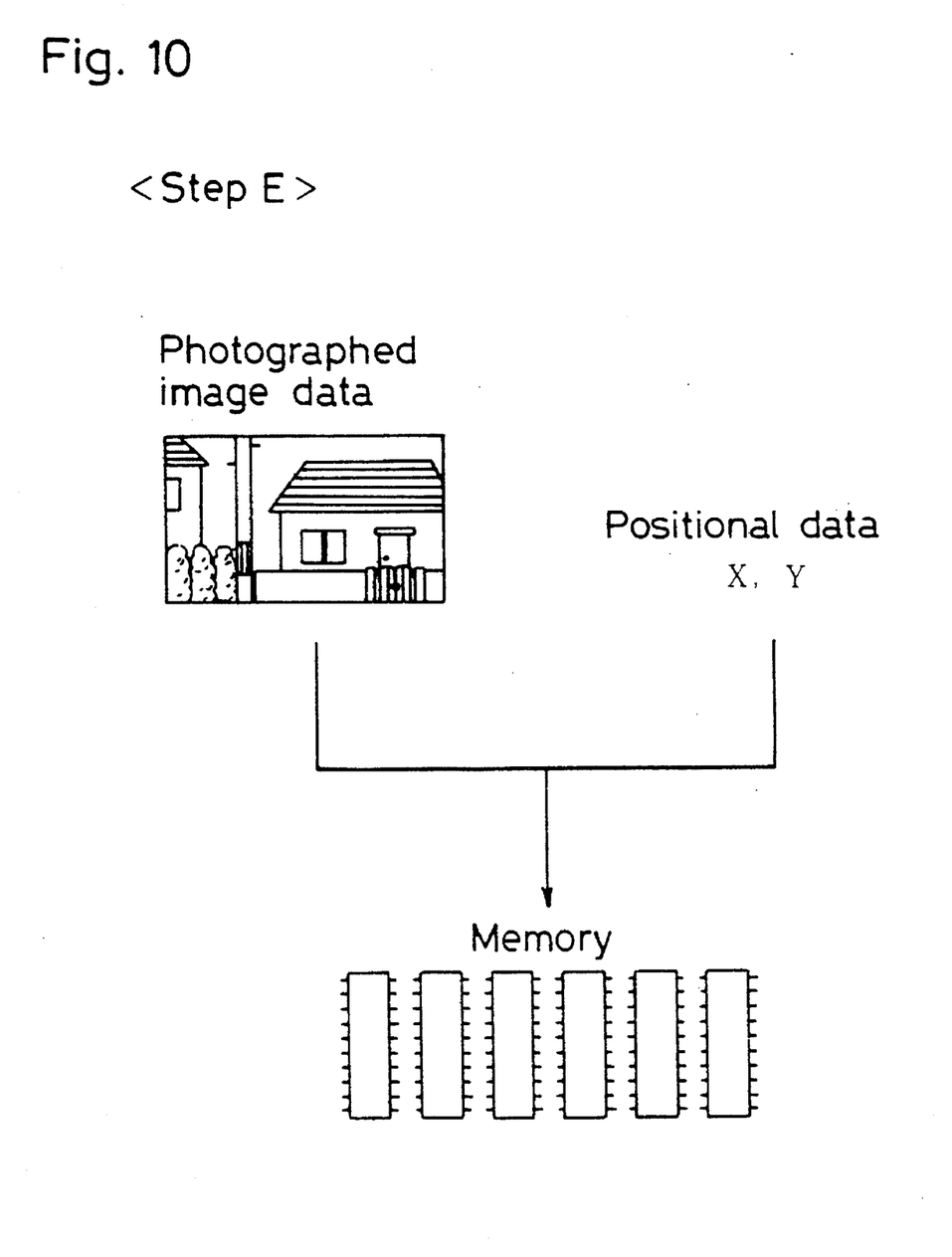
FIG. 10 is an explanatory diagram showing "Step E" in the spot state recording method in accordance with the invention.

<Step D> (FIG. 10)

The pose of the handy computer 60 is adjusted so that the actual spot to be inspected falls within a view field of the image pickup unit, and then the portion to be inspected is photographed. In the example shown, a detached house is to be photographed, and the image of the house is picked up on the display screen. Since the image which is currently being caught by the image pickup unit is monitored by the display unit 6, the image is adjusted to an optimum image by operating a specifying key on the key board 7. After it is confirmed that the image is in the optimum state, the decision key is pressed. It is unnecessary to adjust image every time, and if photographing is made under the same environment, the image adjustment state immediately before may be maintained as it is.

<Step E> (FIG. 10)

The photographed image data transmitted from the image pickup unit to the microprocessor through the bus and the positional data X and Y are stored in the memory in associated with each other. As a result, it is managed to which portion in the map information the photographed image data of the house corresponds.

Figure 11:
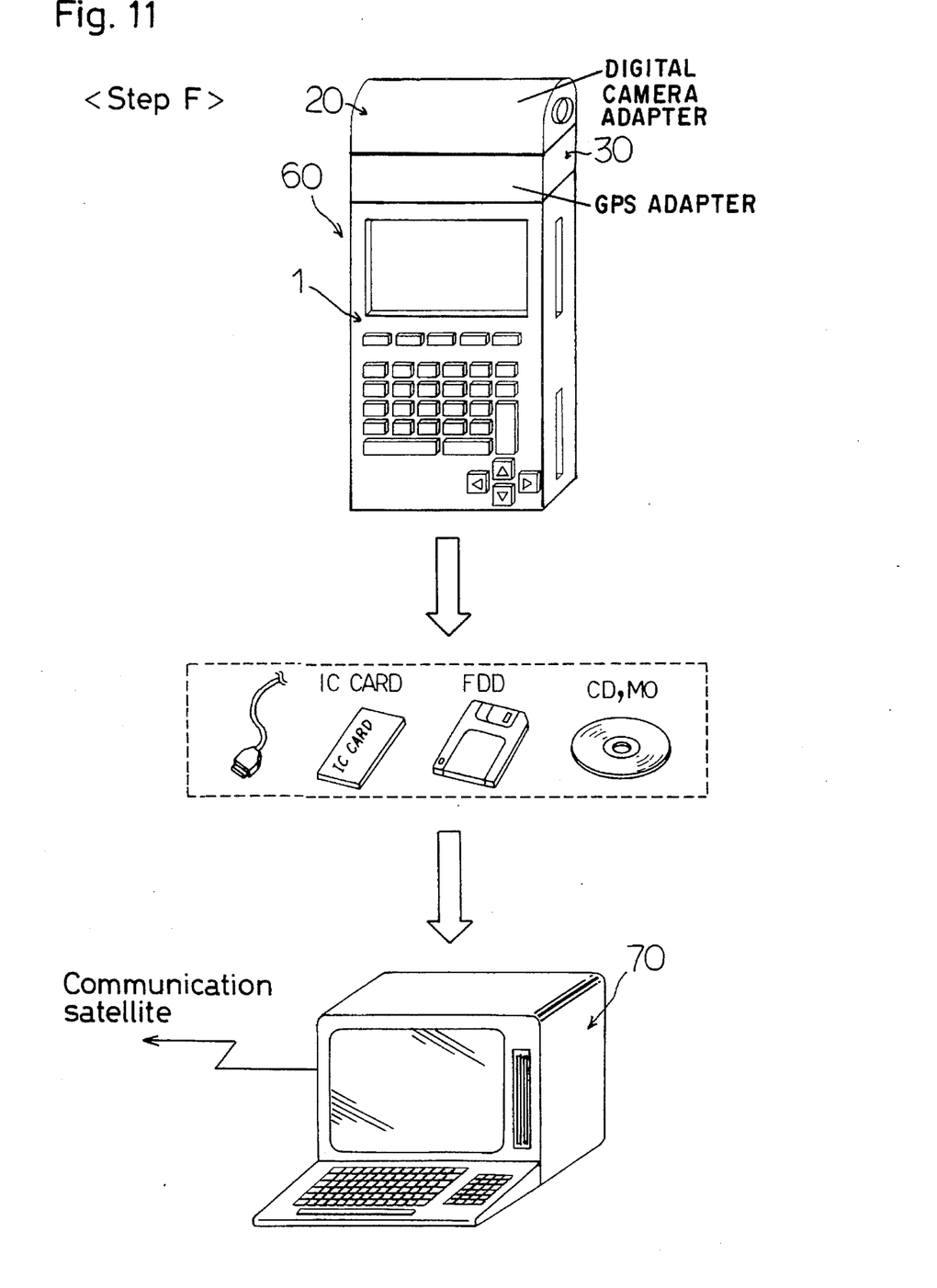
FIG. 11 is an explanatory diagram showing "Step F" in the spot state recording method in accordance with the invention.

<Step F> (FIG. 11)

Upon termination of photograph in the spot, the photographed image data and the positional data which have been stored in a memory means of the handy computer body 1 in association with each other are delivered to the computer 70 located in the fixed base. The delivery of data from the handy computer 60 to the computer 70 may be executed by the same manner as that in Step A.

Through the above-mentioned respective steps, there is obtained information in which the photographed image data of the house and the positional data of the spot at which the house is located on the map are integrated with each other. The positional data on the map allows the location of the house to be clarified, and the photographed image data of the house allows the external appearance of the house and the environment close to the spot to be revealed, as the result of which it is extremely useful for immovable property information. This information can be used as itself, or used by adding other correlated information thereto.

As was described above, the embodiments are applied to a case of inspecting the construction work state by making the positional data on the floor plan in association with the photographed image data of the damage portion, and an example of preparing article information of the ready-built house by making the positional data on the map in association with the photographed image data of the house. However, the present invention is also applicable to other fields.

For example, it can be also used for inspecting the maintenance of a building on the basis of the building drawing, maintaining a road on the basis of a road map, maintaining rivers on the basis of a river map, maintaining rails on the basis of a railway map, inspecting a public work or road work state on the basis of a general map or a road map, inspecting an accident spot on the basis of the same general or road map, or the like. Also, as for a rather unusual application, it can be applied to a record of control over an illegal parking. In the case of using the information of a record of control over the illegal parking, after inputting a car number, the type of the car, a parking time, a parking period of time, a parking location, and the like through the key board, the scene most precisely showing the parking state is photographed.

According to the present invention, the photographed image data of a spot and positional data representing where the spot positions on the drawing or map stored in association with each other. Therefore, there is not required a complicated operation in which both of a camera and a drawing are carried to a spot, a photograph is taken at the spot, and a photographed portion is checked on the drawing. Further, since the photographed image data output from the image pickup unit using a charge coupled device is of a digital signal, it is suitable for computer processing to allow a data transfer and a data processing at a high speed. It is also possible to directly input the related information such as numerals, marks, and the like through the key board by the input operating means attached to the handy computer. Other data groups related to the photographed image data as well as the positional data is capable of being recorded together.

Further, as claimed in the claim 2, a transportable memory medium is detachably provided in the handy computer and the computer located on the fixed base, and when data transfer is made between both computers using the transportable memory medium, more-advanced data processing or data controlling can be made.

Further, as claimed in the claim 3, when the handy computer is equipped with the GPS using the communication satellite which can measure an absolute position, the rough position of the present location position is capable of being automatically specified. As a result, fine adjustment of the rough position made on the basis of the data on the location position is sufficient to specify and indicate a portion to be photographed with ease.

Further, as claimed in the claim 4, in the case where the image pickup unit is detachably attached to the handy computer body, as occasion demands, the image pickup unit is detached from the handy computer body, and other peripheral equipments such as a printer, MODEM, or the like can be connected to the bus coupling terminal to which the image pickup unit had been fixed, to thereby realize multifunction processing while maintaining simplicity of the handy computer.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A computer with a built-in digital camera in which an image pickup unit including a charge coupled device and an imaging lens is coupled with a computer body including a portable interior power source and a bus coupling terminal for connection of a peripheral equipment, said computer comprising:

memory means for storing map information which includes a location to be inspected;

display means for selectively displaying one of said map information and an image photographed by said image pickup unit;

a microprocessor for executing internal processing of said computer body and for processing an image output signal transmitted from said image pickup unit;

input operating means for providing instructions to said computer body and for inputting data;

means for selectively calling said map information of a small area which includes said location to be inspected from said map information stored in said memory means to be inspected for graphic display;

display means for specifying and indicating said location to be inspected in said map information which is graphically displayed on said display means;

means for calculating positional data on said location from said map information specified and indicated on said display means; and means for causing image data to be taken by said image pickup unit at an actual site corresponding to said location in said map information and for storing photographed image data transmitted from said image pickup unit in association with said positional data of said location.

2. A computer with a built-in digital camera as claimed in claim 1, further comprising a transportable memory medium having a memory capacity for storing the map information of the large area including the prearranged spot to be inspected, said transportable memory medium being detachably attached to said computer and a computer located in a fixed base, said transportable memory medium constituting data medium between said computer and said computer.

3. A computer with a built-in digital camera as claimed in claim 1 or 2, further comprising a GPS adaptor using a communication satellite for measuring an absolute position.

4. A computer with a built-in digital camera as claimed in claim 1, wherein said image pickup unit is detachably attached to said handy computer body.

5. A method of recording a spot state, comprising the steps of:

transferring map information of a large area which includes a spot to be inspected from a library for the map stored in a computer located in a fixed base to a computer with a built-in digital camera directly or through a portable memory medium;

Carrying said computer with said built-in digital camera which stores map information of a large area which includes the spot to be inspected, and selectively calling, on a display means, the map information of a small area which includes an actual spot to be inspected from the whole information of the map of a large area stored in said memory means for graphic display;

specifying and displaying the actual spot to be inspected in the map information of a small area graphically displayed on said display means, and calculating positional data of the portion on the map information;

adjusting a pose of said computer with said built-in digital camera so that the actual spot to be inspected falls within a view field of an image pickup unit to photograph the portion to be inspected;

storing the photographed image data transmitted from said image pickup unit and said positional data in association with each other in a memory means; and transferring the photographed image data and the positional data stored in association with each other in said memory means of said computer body to said computer located in said fixed base directly or through a portable memory medium.

6. A computer with a built-in digital camera in which an image pickup unit including a charge coupled device and an imaging lens is coupled with a computer body including a portable interior power source and a bus coupling terminal for connection of a peripheral equipment, said computer comprising:

memory means for storing drawing information which includes a location to be inspected;

display means for selectively displaying said drawing information and an image photographed by said image pickup unit;

a microprocessor for executing internal processing of said computer body and for processing an image output signal transmitted from said image pickup unit;

input operating means for providing instructions to said computer body and for inputting data;

means for selectively calling said drawing information of a small area which includes said location to be inspected from said drawing information stored in said memory means to be inspected for graphic display;

display means for specifying and indicating said location to be inspected in said drawing information which is graphically displayed on said display means;

means for calculating positional data on said location from said drawing information specified and indicated on said display means; and means for causing image data to be taken by said image pickup unit at an actual site corresponding to said location in said drawing information and for storing photographed image data transmitted from said image pickup unit in association with said positional data of said location.

* * * * *